US010568400B2

(12) United States Patent
Shechter et al.

(10) Patent No.: US 10,568,400 B2
(45) Date of Patent: Feb. 25, 2020

(54) ROLLING LUGGAGE ARTICLE

(71) Applicant: All Bond LTD, Kiryat Tiv'on (IL)

(72) Inventors: Dov Shechter, Kiryat Tiv'on (IL); Ehud Pasternak, Hadera (IL); Avi Skovlevitz, Kiryat Ono (IL)

(73) Assignee: ALL BOND LTD, Kiryat Tiv'On (IL)

( * ) Notice: Subject to any disclaimer, the term of this patent is extended or adjusted under 35 U.S.C. 154(b) by 0 days.

(21) Appl. No.: 16/367,438

(22) Filed: Mar. 28, 2019

(65) Prior Publication Data

US 2019/0298022 A1    Oct. 3, 2019

Related U.S. Application Data

(60) Provisional application No. 62/649,670, filed on Mar. 29, 2018.

(51) Int. Cl.
| A45C 5/14 | (2006.01) |
| B62B 5/06 | (2006.01) |
| B62B 3/02 | (2006.01) |
| B62B 1/00 | (2006.01) |
| A45C 5/03 | (2006.01) |
| A45C 13/26 | (2006.01) |
| B60B 19/00 | (2006.01) |

(52) U.S. Cl.
CPC ............... *A45C 5/146* (2013.01); *A45C 5/03* (2013.01); *A45C 13/262* (2013.01); *B62B 1/002* (2013.01); *B62B 1/008* (2013.01); *B62B 3/02* (2013.01); *B62B 5/067* (2013.01); *A45C 2013/267* (2013.01); *B60B 19/003* (2013.01); *B62B 2202/24* (2013.01)

(58) Field of Classification Search
CPC ...................................................... A45C 5/146
USPC ................................... 190/18 A; 280/37, 38
See application file for complete search history.

(56) References Cited

U.S. PATENT DOCUMENTS

| 2,581,417 | A | * | 1/1952 | Jones | A45C 5/146 280/645 |
| 4,254,850 | A | * | 3/1981 | Knowles | A45C 5/146 16/113.1 |
| 5,519,919 | A | * | 5/1996 | Lee | B62B 1/147 16/113.1 |
| 5,568,848 | A | * | 10/1996 | Liang | A45C 5/14 190/115 |
| 5,873,439 | A | * | 2/1999 | Liang | A45C 5/14 16/34 |
| 5,984,326 | A | * | 11/1999 | Abraham | A45C 5/14 190/18 A |
| 6,082,510 | A | * | 7/2000 | Liang | A45C 5/14 16/34 |

(Continued)

*Primary Examiner* — Jeffrey J Restifo
(74) *Attorney, Agent, or Firm* — Michael J. Feigin, Esq.; Feigin and Fridman LLC

(57) ABSTRACT

A luggage article comprising a body including a top face, a bottom face, an a plurality of side faces. A first pair of wheels is disposed at the bottom face of the body. A handle has a first operative orientation wherein the handle is disposed within the body and a second operative orientation wherein the handle extracted from the body. A central wheel is functionally associated with the handle, such that in the first operative orientation of the handle, the central wheel is retracted and disposed in or adjacent a face of the body, and in the second operative orientation the central wheel is extracted and extends outwardly from the body.

17 Claims, 15 Drawing Sheets

(56) References Cited

U.S. PATENT DOCUMENTS

| | | | |
|---|---|---|---|
| 6,182,981 B1* | 2/2001 | Kuo | A45C 5/14 190/18 A |
| 6,186,522 B1* | 2/2001 | Weis | A45C 5/146 280/37 |
| 6,237,734 B1* | 5/2001 | Chen | A45C 5/14 108/119 |
| 6,279,705 B1* | 8/2001 | Wu | A45C 5/14 190/115 |
| 6,345,414 B1* | 2/2002 | Chen | A45C 5/14 16/113.1 |
| 6,460,866 B1* | 10/2002 | Altschul | A45F 4/02 150/159 |
| 6,497,311 B2* | 12/2002 | Tiramani | A45C 3/001 16/113.1 |
| 6,802,409 B1* | 10/2004 | Tiramani | A45C 3/001 16/113.1 |
| 7,226,073 B1* | 6/2007 | Zahiri | A45C 5/14 190/115 |
| 7,246,805 B2* | 7/2007 | Neal | A45C 5/14 280/35 |
| 7,837,206 B1* | 11/2010 | Lee | A45C 5/14 280/30 |
| 8,020,678 B2* | 9/2011 | Tsai | A45C 5/146 190/115 |
| 8,033,369 B2* | 10/2011 | Sherrell | A45C 5/146 190/18 A |
| 8,201,837 B2* | 6/2012 | Dweek | A45C 5/146 224/153 |
| 8,282,109 B1* | 10/2012 | Arjomand | A45F 4/02 280/30 |
| 8,286,767 B2* | 10/2012 | Malinowski | A45C 5/14 190/115 |
| 8,469,374 B2* | 6/2013 | Graf Von Bismarck | A45C 5/146 280/30 |
| 8,490,765 B2* | 7/2013 | Lee | A45C 5/146 190/18 A |
| 8,757,643 B2* | 6/2014 | Arthur | A45C 5/146 16/34 |
| 9,095,193 B1* | 8/2015 | Al-Hashemi | A45C 5/146 |
| 10,206,469 B2* | 2/2019 | Pickavance | A45F 4/00 |
| 10,212,999 B2* | 2/2019 | Clarke | A45C 9/00 |
| 10,238,195 B2* | 3/2019 | Clarke | A45C 5/14 |
| 2008/0135366 A1* | 6/2008 | Katz | A45C 5/14 190/18 A |
| 2008/0223679 A1* | 9/2008 | Wong | A45C 13/385 190/18 A |
| 2010/0175960 A1* | 7/2010 | Moskowitz | A45C 5/14 190/11 |

* cited by examiner

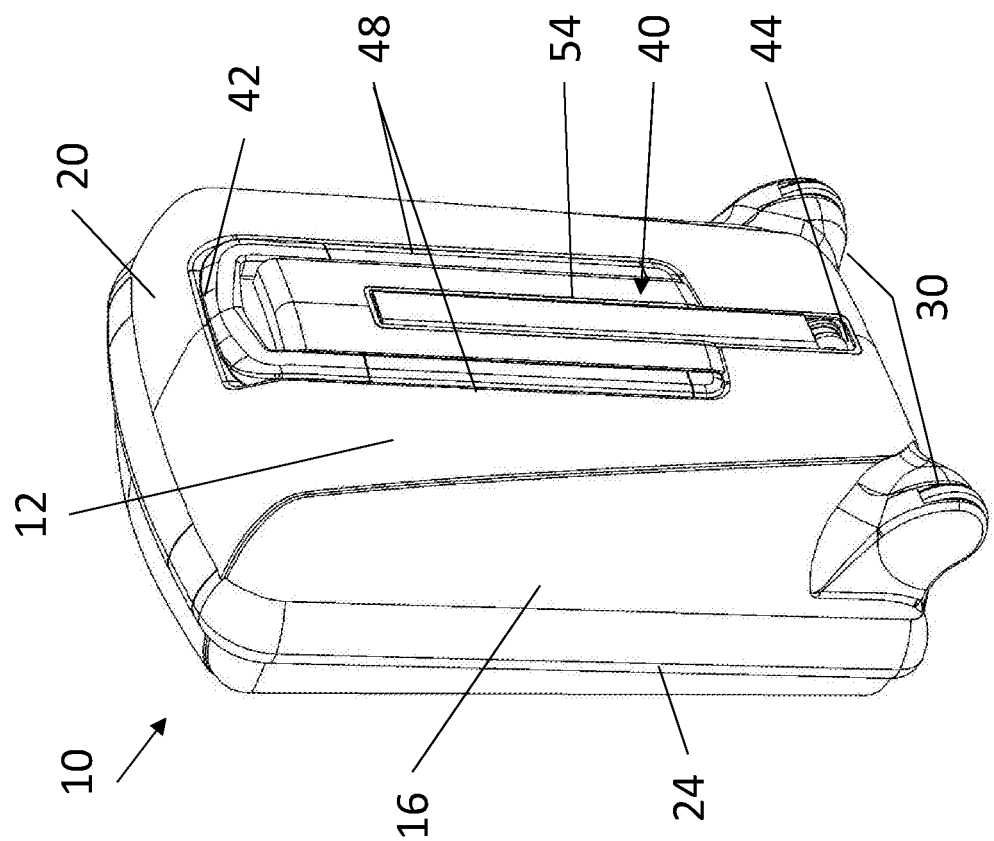

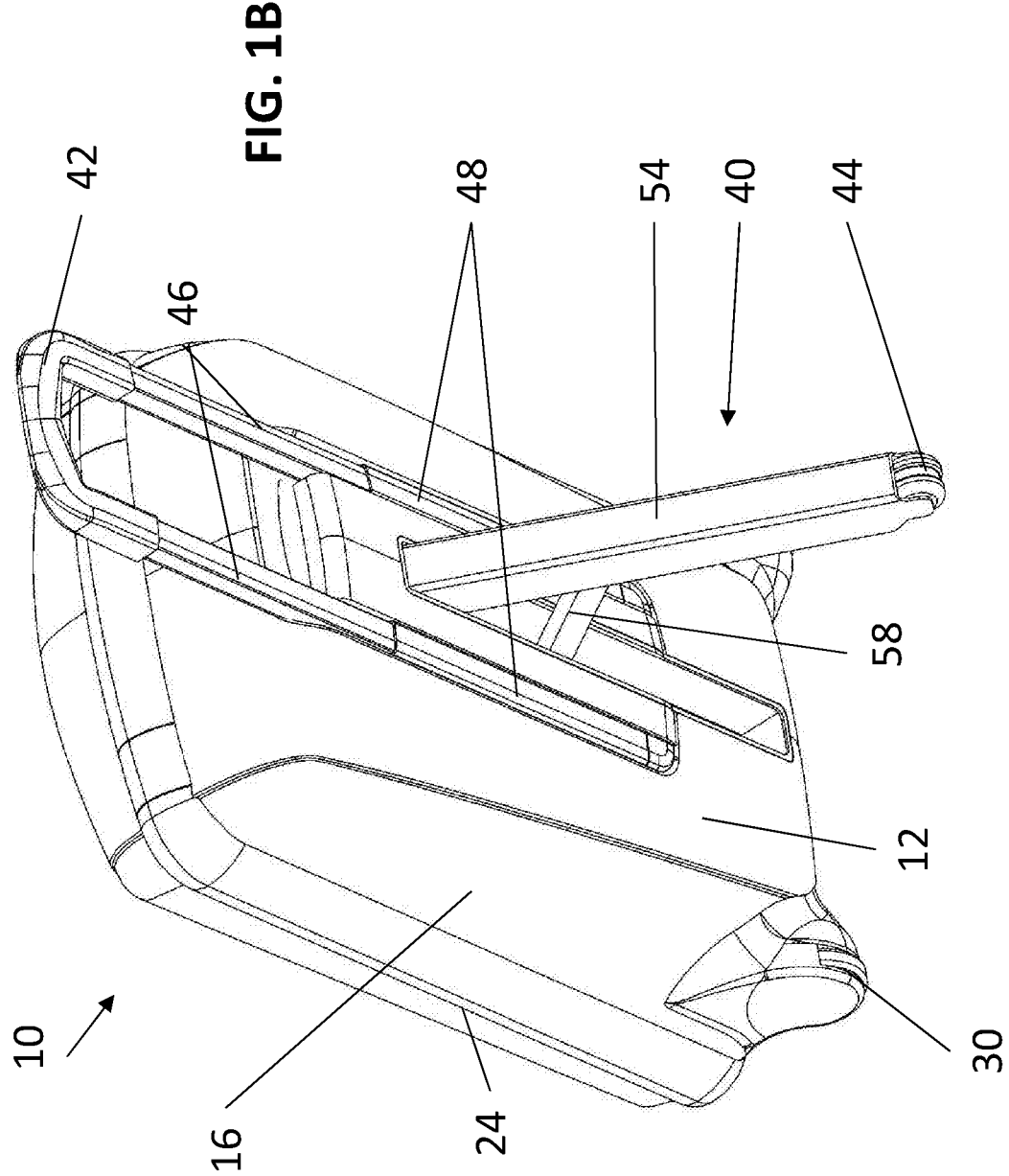

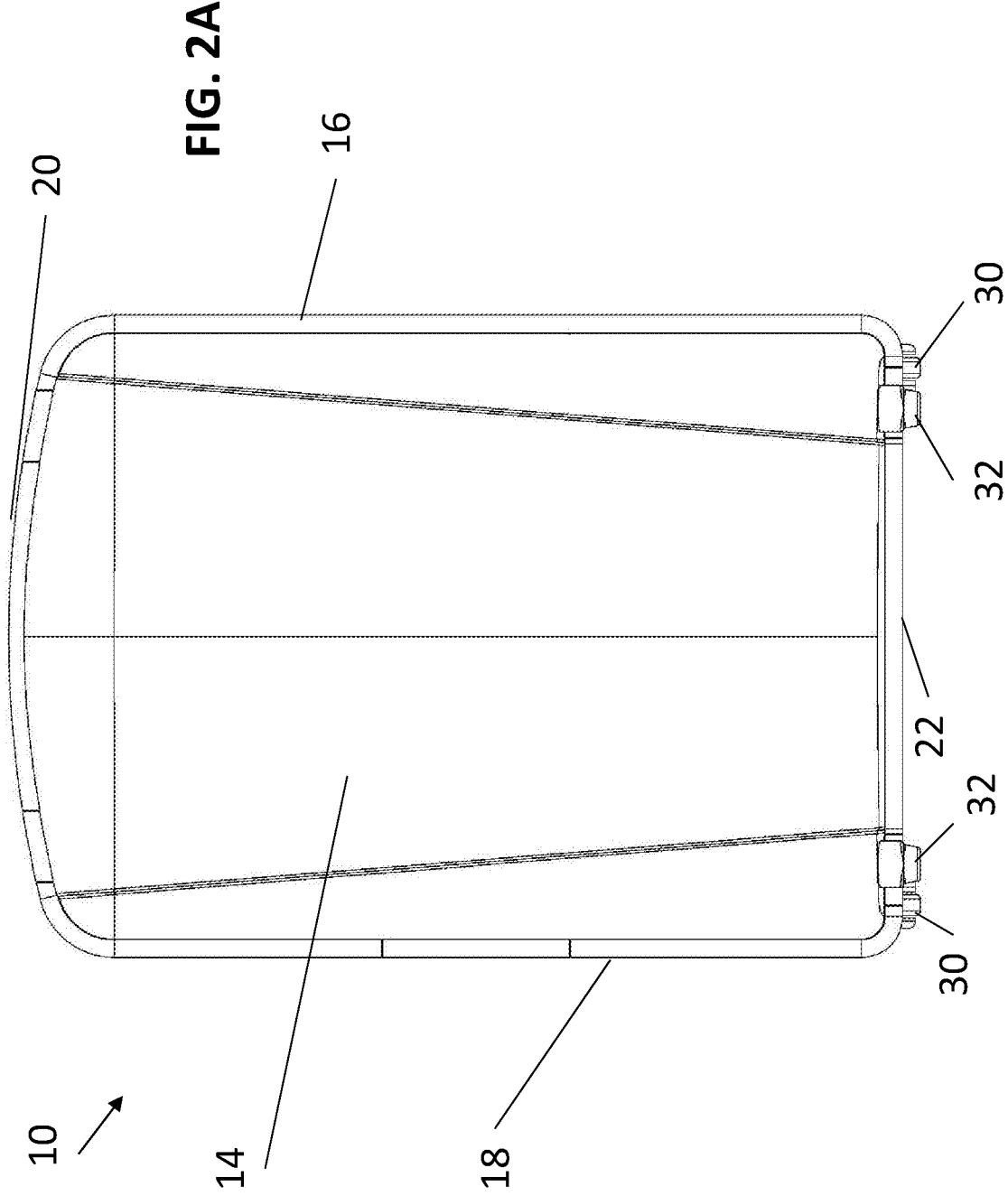

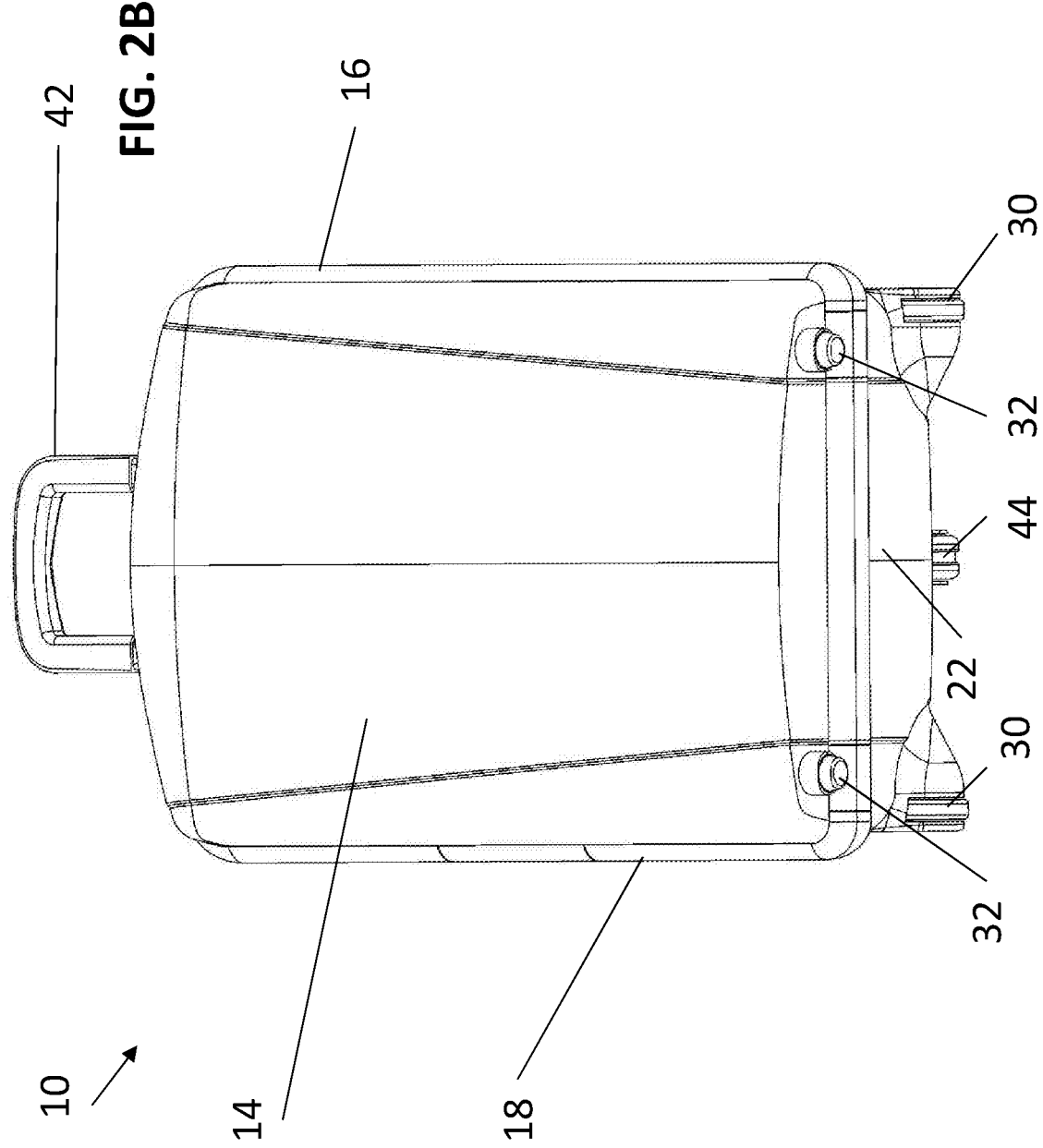

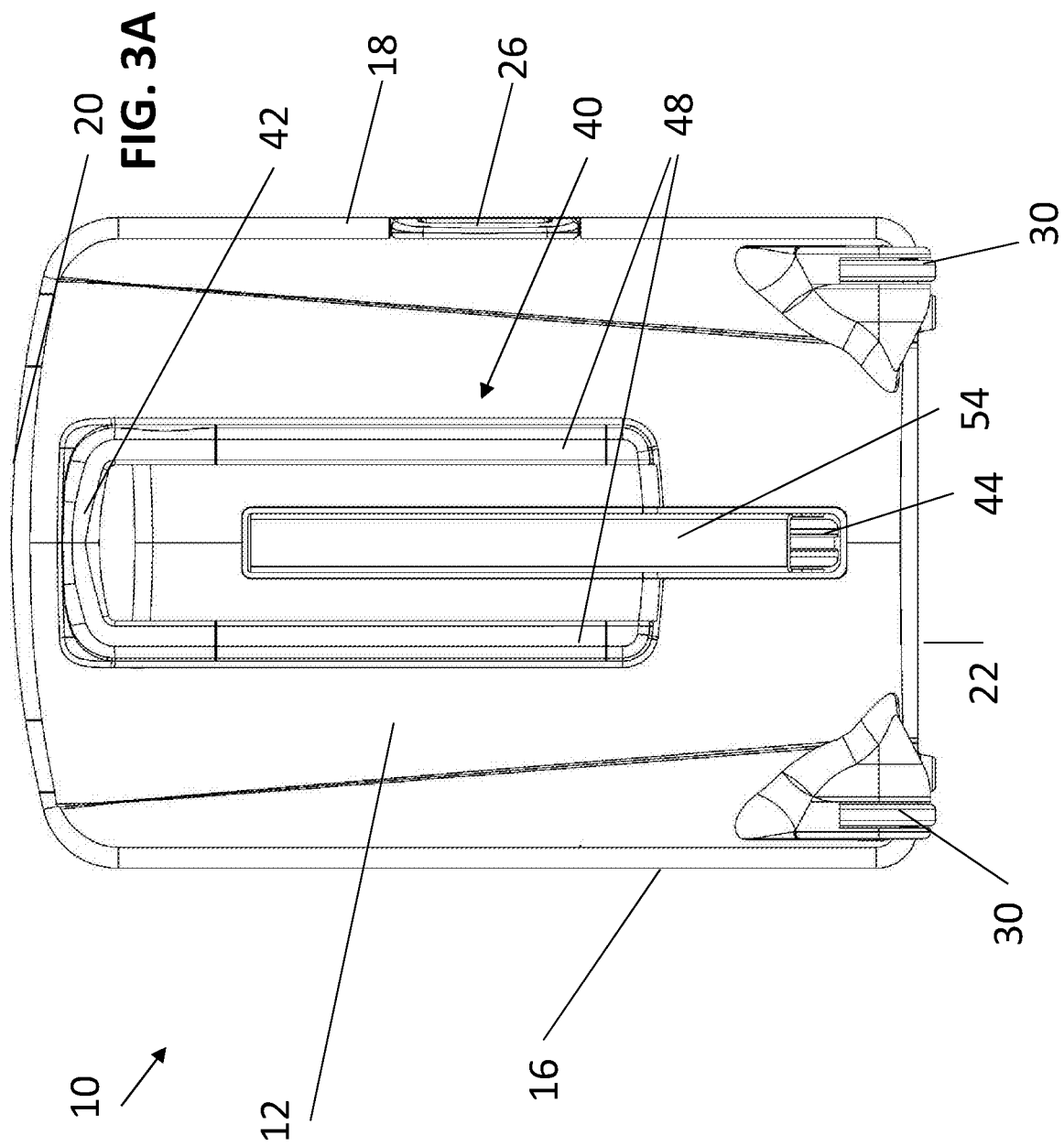

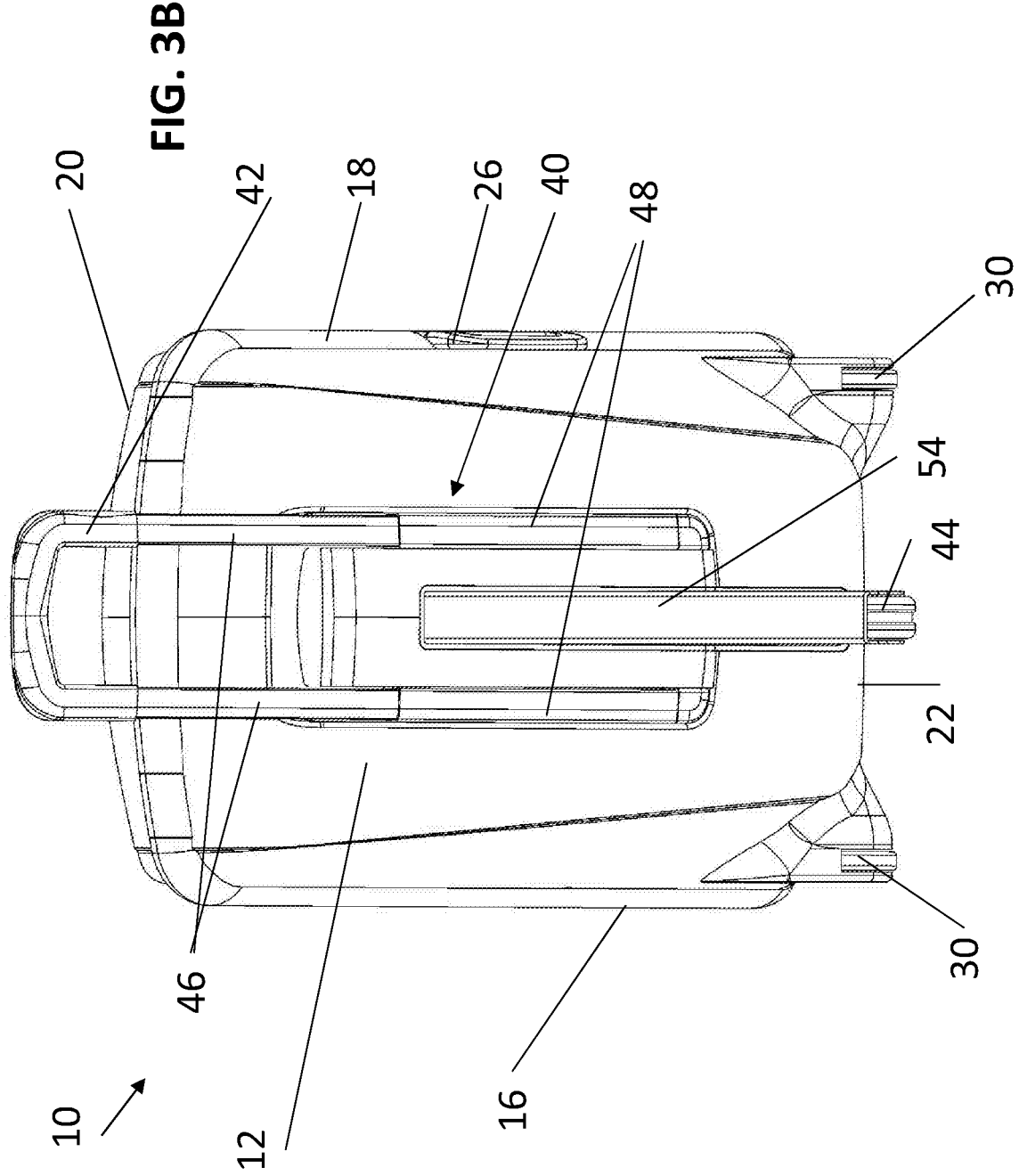

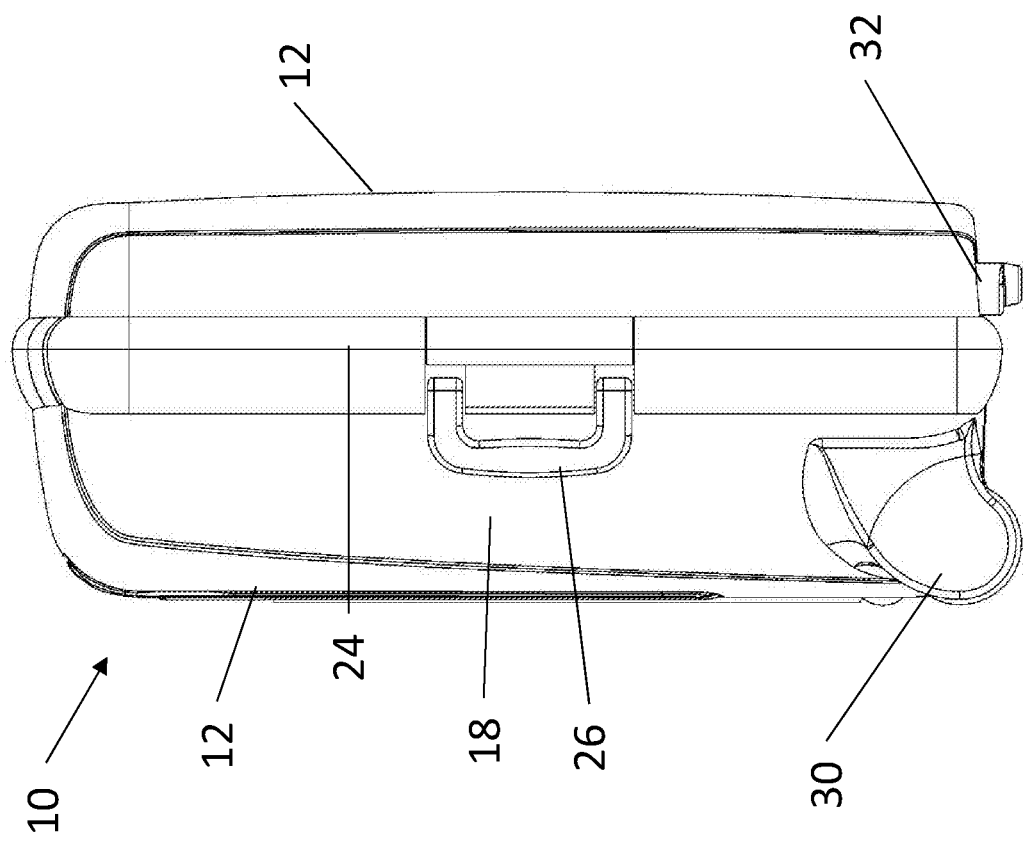

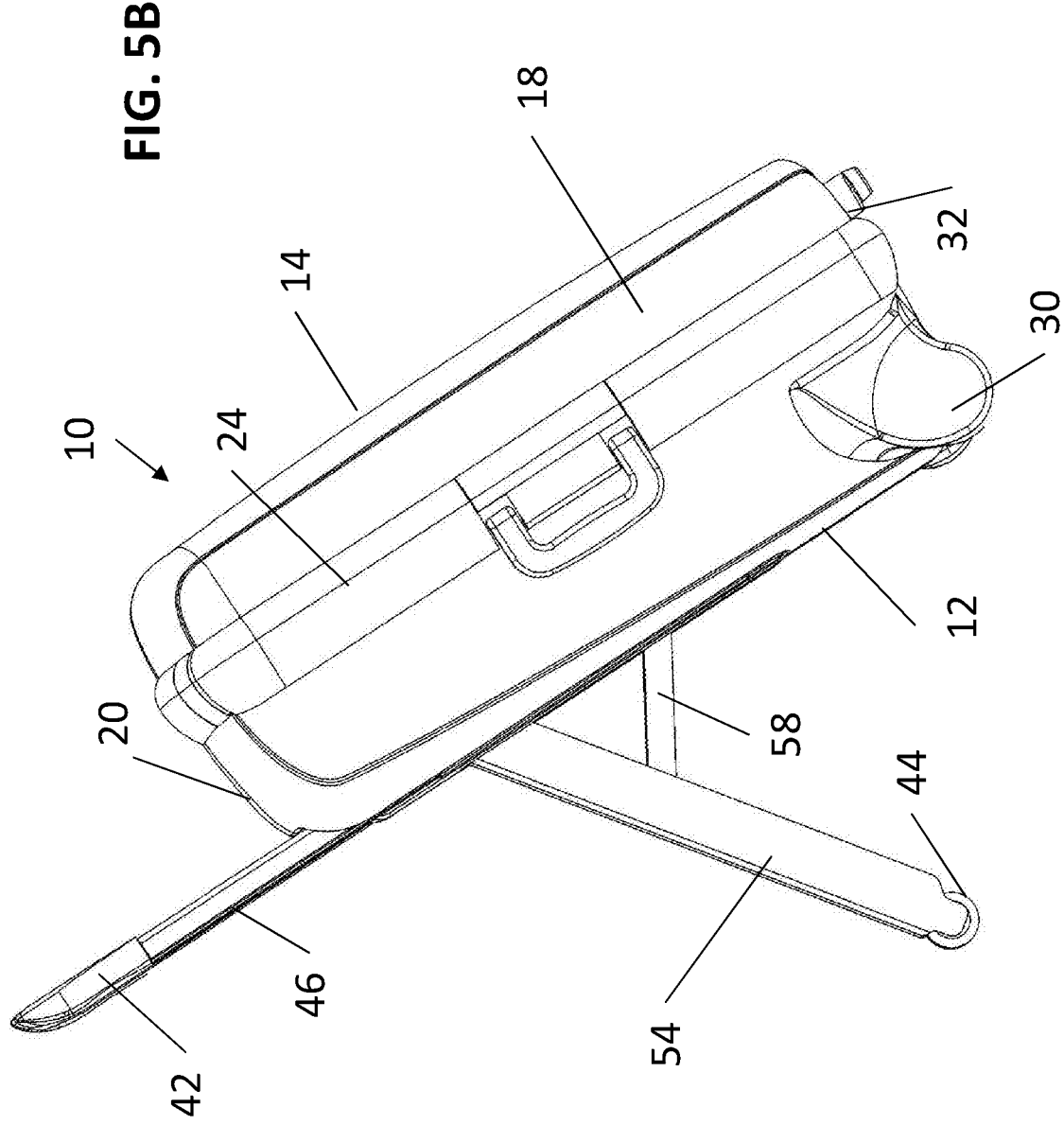

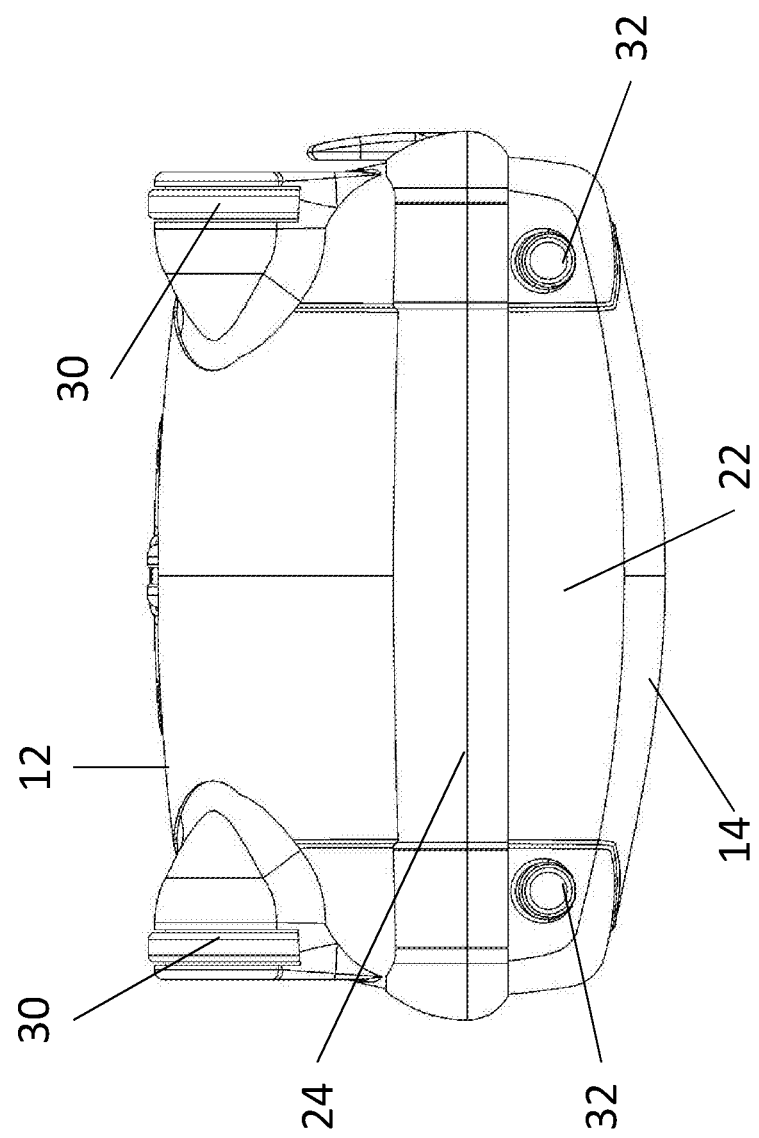

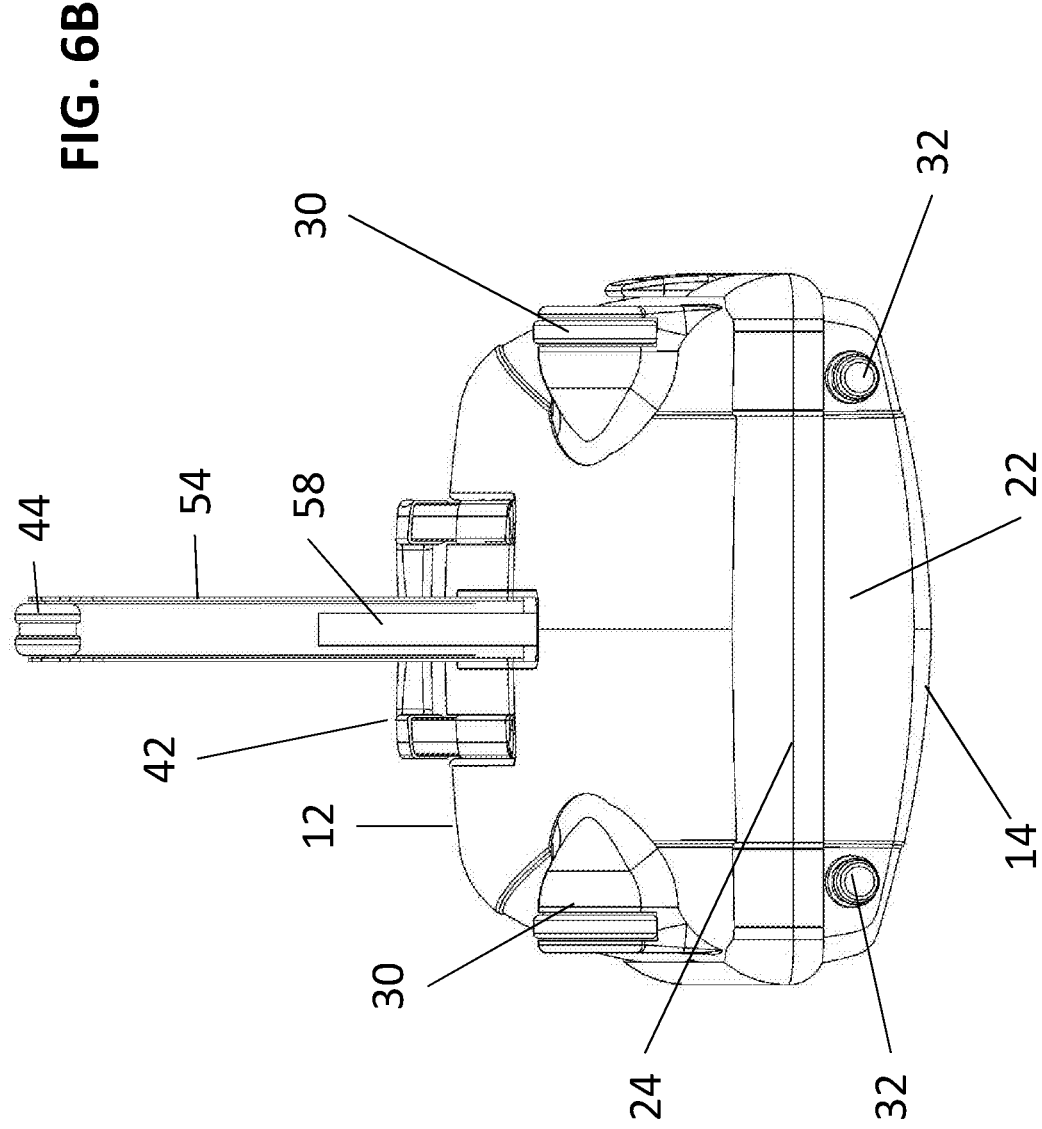

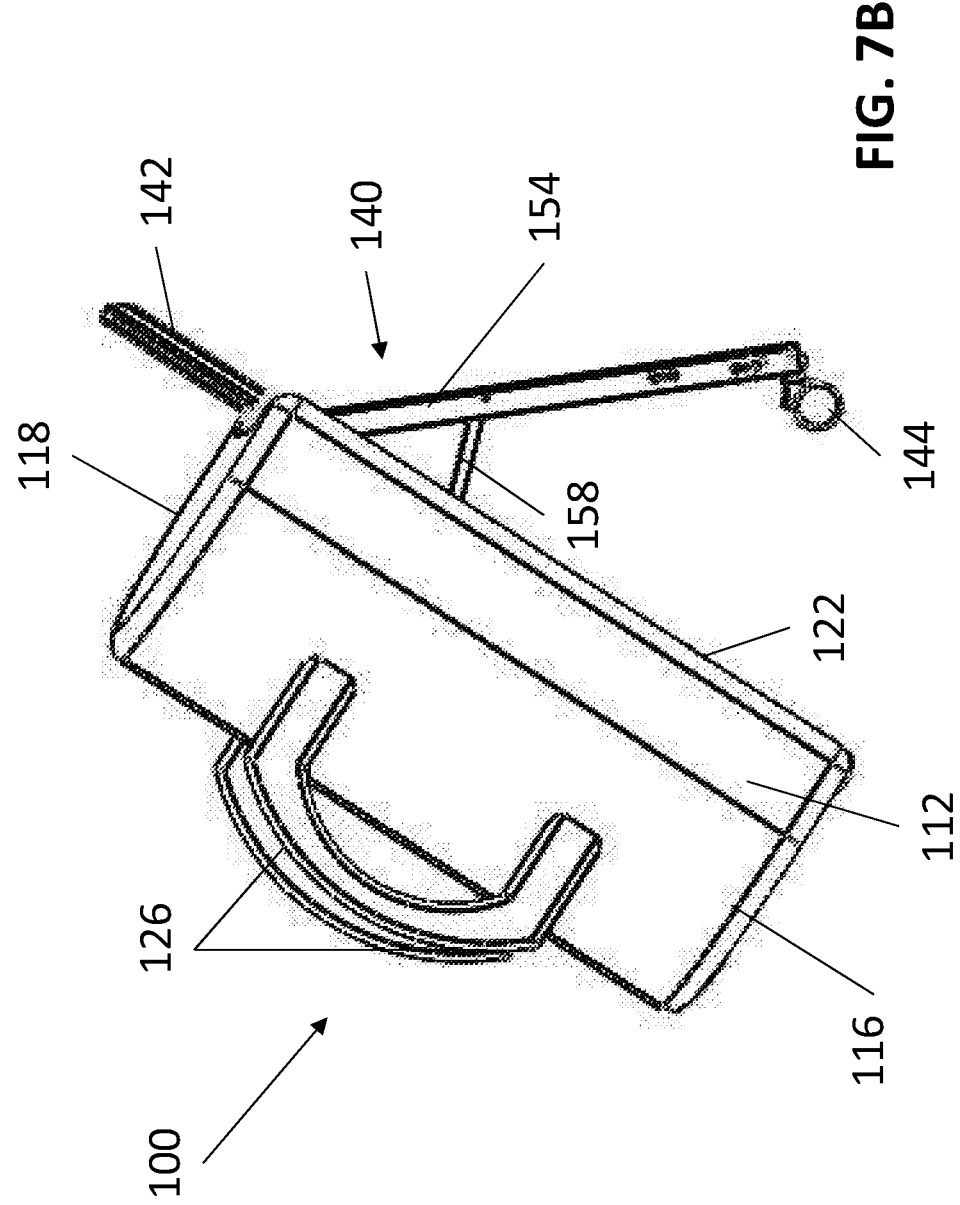

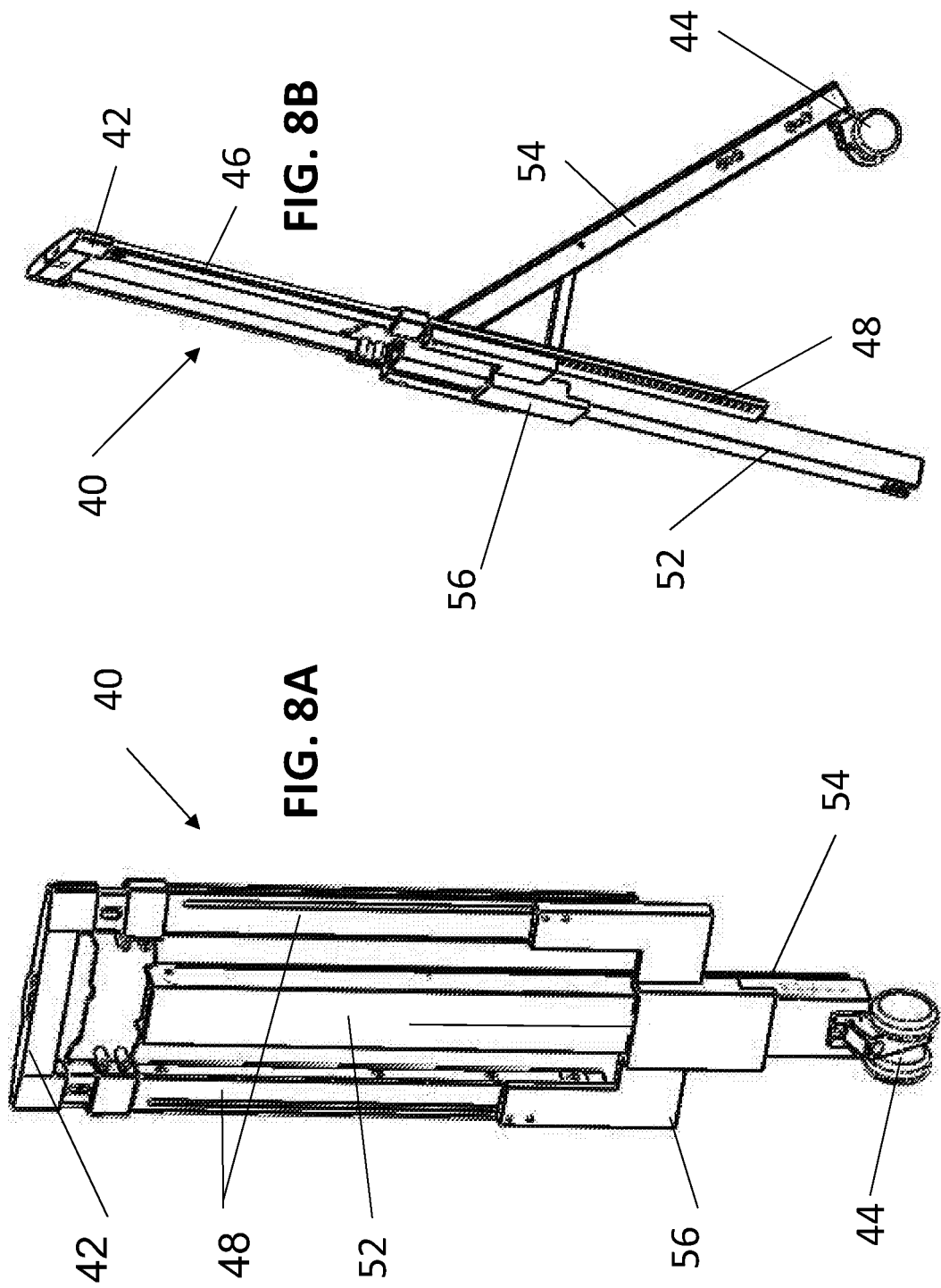

ROLLING LUGGAGE ARTICLE

FIELD OF THE INVENTION

The present invention relates to luggage articles, and specifically to luggage articles that can be rolled or moved from one place to another, and for method of use thereof.

BACKGROUND OF THE INVENTION

Most suitcases sold nowadays include two or four wheels, to assist in moving the suitcases from place to place.

Suitcases having two wheels must be balanced by the user, and thus the user bears some of the weight of the suitcase while moving the suitcase.

Suitcases having four wheels are advantageous over suitcases having two wheels, as they can be moved by a user without the user feeling the weight of the suitcase, since the wheels carry and absorb the weight.

However, a suitcase with four wheels has some evident disadvantages, making its use inconvenient and frustrating. Two main disadvantages are:

1. The angle at which the handle for pushing the suitcase is disposed relative to the suitcase, is unsuitable for the natural position of the human hand. As such, use of the handle for extended durations, or to push the suitcase for a large distance, causes the user pains in the hands or arms. Consequently, many users prefer to tilt their four wheel suitcase, and to push or pull the suitcase on its back wheels, as if it were two wheel suitcases, thus negating the advantage of the user not having to bear the weight of the suitcase.

2. All four wheels of the suitcase extend beyond the perimeter of the suitcase, and are exposed to pressure and bumping during loading and unloading of the suitcase onto a vehicle and/or onto a collection carousel. As a result, the wheels often break, sometimes together with the point of connection of the wheels, such that they are unfixable.

There is thus a need in the art for a suitcase that can be conveniently pushed by the user, without the user having to bear the weight of the suitcase.

SUMMARY OF THE INVENTION

The present invention relates to a luggage article having a plurality of wheels on a bottom surface thereof, and an additional retractable wheel, functionally associated with a retractable handle of the luggage article.

In accordance with an embodiment of the present invention, there is provided a luggage article, including:

a body including a top face, a bottom face, and a plurality of side faces;

a first pair of wheels disposed at the bottom face of the body;

a handle, having a first operative orientation wherein a majority of the handle is disposed within the body and a second operative orientation wherein the handle is extracted from the body; and a central wheel, functionally associated with the handle, such that in the first operative orientation of the handle, the central wheel is retracted and disposed in or adjacent one of the plurality of side faces or the bottom face of the body, and in the second operative orientation the central wheel is extracted and extends outwardly from the body.

In some embodiments, the luggage article is a suitcase. In some such embodiments, the handle is extractable from the top face, in the first operative orientation of the handle the central wheel is disposed adjacent a back side face of the plurality of side faces of the body, and in the second operative orientation the central wheel extends away from the back side face.

In some embodiments, the luggage article is a duffle bag. In some such embodiments, the handle is extractable from one of the plurality of side faces, in the first operative orientation of the handle the central wheel is disposed adjacent the bottom face of the body, and in the second operative orientation the central wheel extends away from the bottom face.

In some embodiments, in the second operative orientation of the handle, the luggage article is supported on the first pair of wheels and the retractable wheel.

In some embodiments, each wheel of the first pair of wheels is an omnidirectional wheel. In some embodiments, the central wheel is an omnidirectional wheel.

In some embodiments, the suitcase further includes a pair of supports disposed on the bottom face of the body, wherein in the first operative orientation of the handle the luggage article is supported on the first pair of wheels and on the pair of supports. In some embodiments, each support of the pair of supports includes a wheel, such that when the luggage article is in the first operative orientation of the handle, the luggage article is rollable on the first pair of wheels and the pair of supports.

In some embodiments, the luggage article further includes a handle and wheel extraction mechanism forming the functional association between the handle and the central wheel, the handle and wheel extraction mechanism including a pair of handle extension rods extending downwardly from the handle, and a pair of handle guides, having the handle extension rods slidably disposed therein, wherein extraction of the handles results in the handle extension rods sliding upwardly within the handle guides.

In some embodiments, the handle and wheel extraction mechanism further includes a wheel guide bar fixed between the handle guides, and a central leg, pivotally connected at a top end thereof to the wheel guide bar, and terminating at a bottom end thereof in the central wheel, wherein, when the handle is in the first operative orientation, the central leg is disposed within the wheel guide bar.

In some embodiments, the handle and wheel extraction mechanism further includes a central wheel driving element fixedly attached to the handle extension rods and slidably disposed within the handle guides, the central wheel driving element being slidable along the wheel guide bar, and a rod, pivotally connected to the central wheel driving element and to the central leg, wherein, when the handle is in the first operative orientation, the rod is disposed parallel to the wheel guide bar and to the central leg, and wherein, as the handle is extracted, the central wheel driving element moves upwardly along the wheel guide bar, causing the rod to pivot relative to the wheel guide bar and to push the central leg outward, away from the body of the luggage article.

In some embodiments, when the handle is in the second operative orientation, the rod is substantially perpendicular to the wheel guide bar.

In some embodiments, the rod includes a first rod portion pivotally connected to the wheel guide bar and a second rod portion pivotally connected to the central leg, the first and second rod portions being pivotable relative to each other, when the handle is in the second operative orientation, the first and second rods are aligned and are both substantially perpendicular to the wheel guide bar, and the handle has a third operative orientation, wherein the handle is partially extracted, and one of the first and second rod portions is substantially perpendicular to the wheel guide bar and the other of the first and second rod portions is substantially parallel to the wheel guide bar.

In some embodiments, the handle and wheel extraction mechanism further includes a handle locking mechanism, adapted to lock a position of the handle relative to the handle guides and a handle release button adapted, when pressed by a user, to release the handle locking mechanism, to facilitate movement of the handle relative to the handle guides, thereby to move the handle between the first operative orientation and the second operative orientation.

In some embodiments, the handle and wheel extraction mechanism further includes a central wheel releasing mechanism, adapted to reversibly disassociate the central wheel from the handle, and a central wheel releasing button adapted, when pressed by a user, to activate the central wheel releasing mechanism, to facilitate transitioning of the handle between the first and second operative orientations while the central wheel remains retracted.

In some embodiments, one of said plurality of side faces or said bottom face includes a recess, and wherein, when the handle is in the first operative orientation, the central wheel is disposed within the recess. In some such embodiments, when the central wheel is disposed within the recess, the central wheel is flush with one of said plurality of side faces or said bottom face.

In accordance with some embodiments of the present invention there is provided a method of using the luggage article described herein, the method including:

moving the handle from the first operative orientation to the second operative orientation of the handle, thereby to extract the central wheel from the body; and rolling the luggage article while the luggage article is supported by the pair of wheels and by the central wheel.

In some embodiments, the method further includes returning the handle from the second operative orientation to the first operative orientation, thereby to retract the central wheel to the body of the luggage article.

BRIEF DESCRIPTION OF THE FIGURES

The foregoing discussion will be understood more readily from the following detailed description of the invention, when taken in conjunction with the accompanying FIGS. 1A-7B), in which:

FIGS. 1A and 1B are back view perspective illustrations of a suitcase having a retractable wheel according to an embodiment of the present invention, in a storage operative orientation and in a rolling operative orientation respectively;

FIGS. 2A and 2B are front view planar illustrations of the suitcase of FIGS. 1A and 1B, in the storage operative orientation and in the rolling operative orientation, respectively;

FIGS. 3A and 3B are back view planar illustrations of the suitcase of FIGS. 1A and 1B, in the storage operative orientation and in the rolling operative orientation, respectively;

FIGS. 5A and 5B are left side view planar illustrations of the suitcase of FIGS. 1A and 1B, in the storage operative orientation and in the rolling operative orientation, respectively;

FIGS. 6A and 6B are bottom view planar illustrations of the suitcase of FIGS. 1A and 1B, in the storage operative orientation and in the rolling operative orientation, respectively;

FIGS. 7A and 7B are perspective view illustrations of a duffle bag having a retractable wheel according to an embodiment of the present invention, in a storage operative orientation and in a rolling operative orientation respectively; and FIGS. 8A and 8B are perspective view illustrations of a handle and wheel extraction mechanism of the suitcase of FIGS. 1A to 6B and of the duffle bag of FIGS. 7A to 7B, in the storage operative orientation and in the rolling operative orientation, respectively.

DESCRIPTION OF THE PREFERRED EMBODIMENTS

Figure 4A:
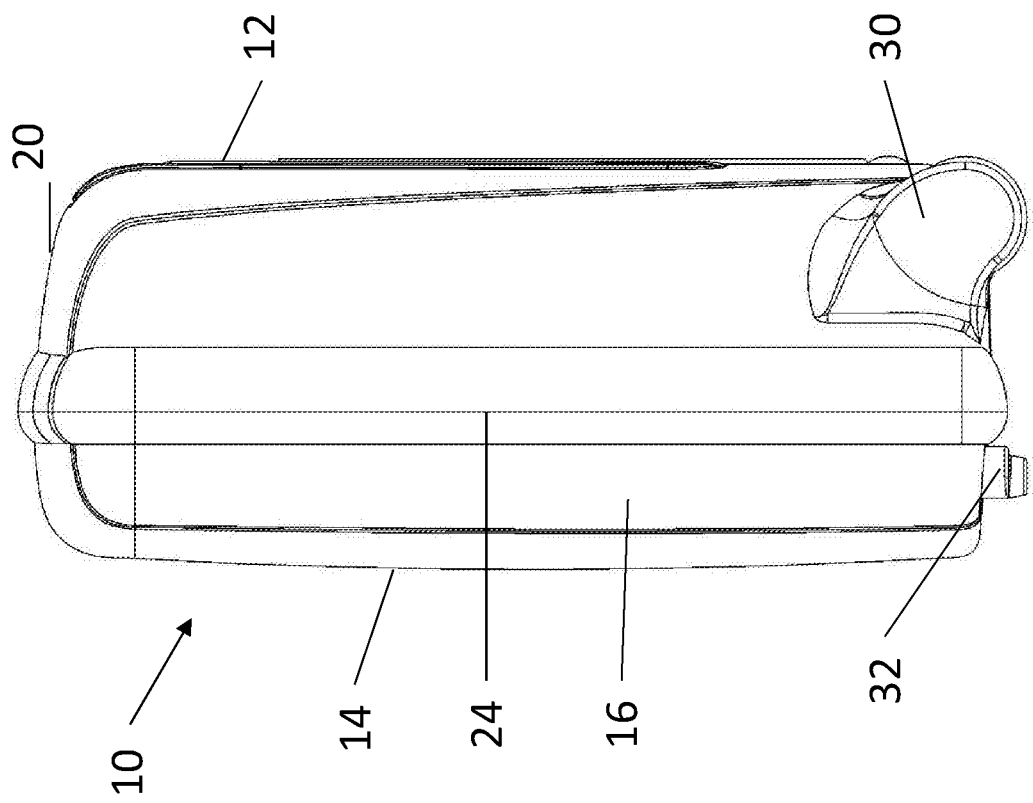
FIGS. 4A and 4B are right side view planar illustrations of the suitcase of FIGS. 1A and 1B, in the storage operative orientation and in the rolling operative orientation, respectively.

The principles of the inventive luggage article and pushing mechanism thereof, and of methods of use of the luggage article, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For the purposes of the present disclosure, the bottom face of a luggage article is the face closest to the floor when the luggage article is stationary, in a position of standard use, and including the wheels of the luggage article, the top face of the luggage article is the face opposite the bottom face, and side faces are the faces connecting the top face and the bottom face.

For the purposes of the present disclosure, the term "luggage article" relates to any article used to carry other items during travel, and may include suitcases, duffle bags, hiking bags, backpacks, mochila bags, and the like.

Figure 4B:
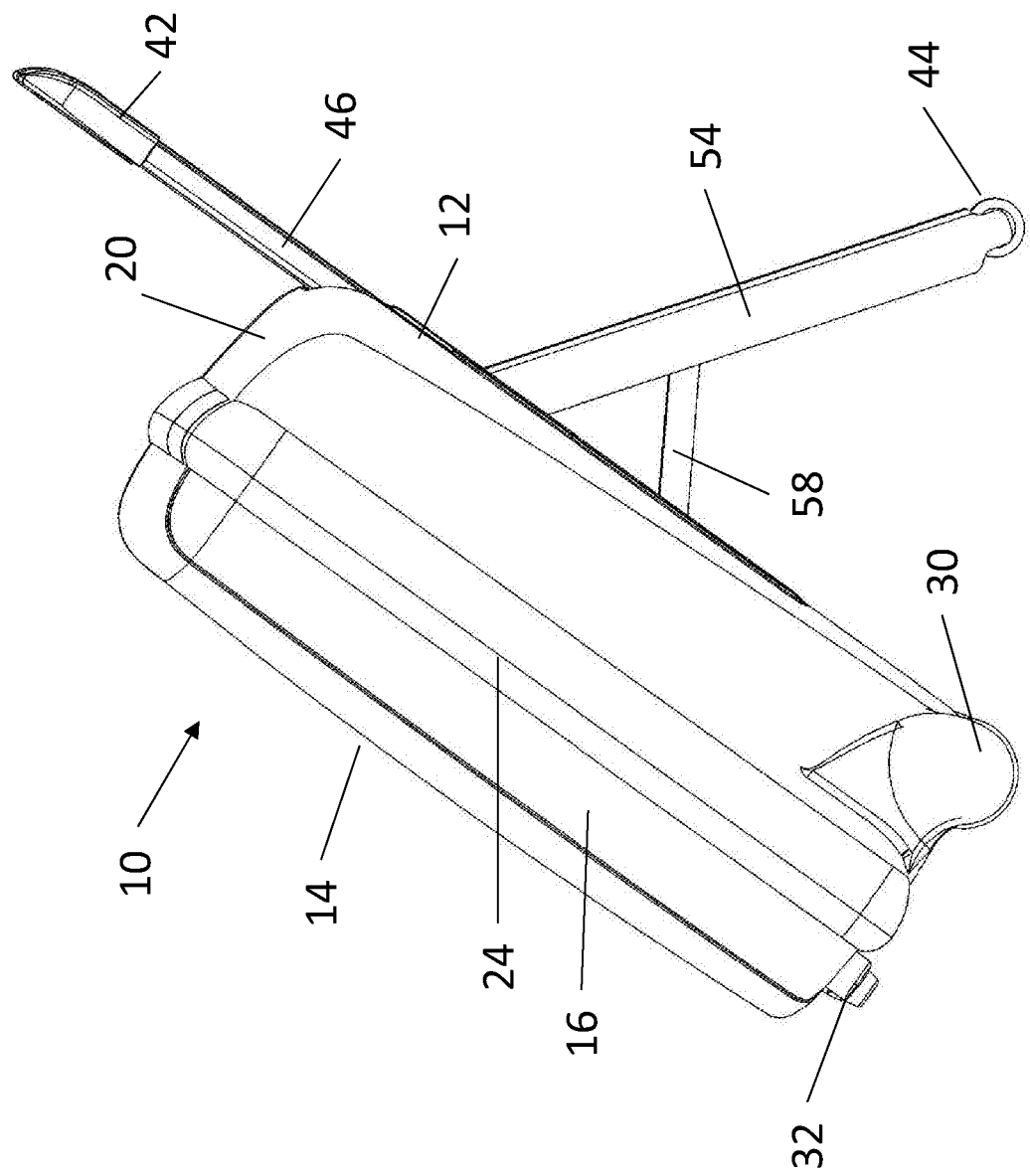

For the purposes of the present disclosure, the term "substantially" is defined as "at least 90% of" or "within 10% deviation of". Reference is now made to FIGS. 1A and 1B, which are back view perspective illustrations of a suitcase 10 having a retractable wheel according to an embodiment of the present invention, in a storage operative orientation and in a rolling operative orientation respectively, to FIGS. 2A and 2B, which are front view planar illustrations of the suitcase 10, in the storage operative orientation and in the rolling operative orientation, respectively, to FIGS. 3A and 3B, which are back view planar illustrations of the suitcase 10, in the storage operative orientation and in the rolling operative orientation, respectively, to FIGS. 4A and 4B, which are right side view planar illustrations of the suitcase 10, in the storage operative orientation and in the rolling operative orientation, respectively, to FIGS. 5A and 5B, which are left side view planar illustrations of the suitcase 10, in the storage operative orientation and in the rolling operative orientation, respectively, and to FIGS. 6A and 6B, which are bottom view planar illustrations of the suitcase 10, in the storage operative orientation and in the rolling operative orientation, respectively.

As seen, suitcase 10 includes a back side face 12, a front side face 14, right side face 16, a left side face 18, a top face 20, and a bottom face 22. The faces 12, 14, 16, 18, 20, and 22 define a suitcase volume V.

In some embodiments, top face 20, bottom face 22, and left side face 18 are each divided into two portions. Right side face 16 includes a hinge, such that the suitcase 10 can be reversibly opened along an opening contour 24 extending through top face 20, left side face 18, and bottom face 22, hinging about the hinge in right side face 16. However, it is appreciated that in some embodiments the suitcase may open in the opposite direction, such that the hinge may be in left side face 18, and right side face 16 may be split into two portions and included in the opening contour 24. Typically, a closure mechanism such as a zipper (not explicitly shown) is defined along opening contour 24, to facilitate reversible opening and closing of the suitcase 10.

In the illustrated embodiments, opening contour 24 extends generally along a centerline of faces 18, 20, and 22, such that when suitcase 10 is open, two volumes are defined. However, it is appreciated that in some embodiments, opening contour 24 may be adjacent front side face 14, such that when the suitcase is opened along opening contour 24 only the front face pivots relative to the remainder of the suitcase, and a single volume is defined by faces 12, 16, 18, 20, and 22 of suitcase 10.

In some embodiments, suitcase 10 includes at least one handle 26, here illustrated as being disposed on left side face 18 of suitcase 10. The handle 26 is pivotable relative to left side face 18, and facilitates carrying of the suitcase, for example to lift it into a vehicle. In some embodiments, handle 26 is disposed on the openable side face of the suitcase, not on the hinged side face of the suitcase.

A pair of wheels 30 are disposed at or adjacent corners of suitcase 10 connecting back face 12, bottom face 22, and each of side faces 16 and 18 of the suitcase. In some embodiments, the wheels 30 are omnidirectional wheels, facilitating moving of the suitcase in a left-right direction, in addition to enabling moving of the suitcase forwards and backwards. Wheels 30 may extend very slightly beyond the perimeter of the suitcase 10, but not to a degree that they would be damaged or broken even if the suitcase were bumped or thrown around.

A pair of supports 32 are disposed at or adjacent corners of suitcase 10 connecting front side face 14, bottom face 22, and each of side faces 16 and 18 of the suitcase.

In some embodiments, the supports 32 comprise wheels, such as ball bearings disposed within suitable sockets, which are rotatable relative to the sockets. In such embodiments, the suitcase 10 may be rolled when in the upright position illustrated in FIG. 1A, using wheels 30 and supports 32.

As seen clearly in FIGS. 1A and 1B, suitcase 10 further includes a handle and wheel extraction mechanism 40 including a reversibly extractable pushing handle 42, functionally associated with a reversibly extractable central wheel 44.

In a first, storage, operative orientation, illustrated in FIGS. 1A, 2A, 3A, 4A, 5A, and 6A, the pushing handle 42 is retracted into the suitcase, and does not extend beyond the perimeter of the suitcase. In the first operative orientation, the wheel extraction mechanism is in the storage position, such that the central wheel 44 is disposed within the suitcase 10, as seen clearly in FIGS. 1A and 3A. In some embodiments, in the storage operative orientation, the central wheel 44 does not extend beyond a perimeter of the suitcase, and is disposed in a recess in the back side face 12 of suitcase 10. In other embodiments, central wheel 44 may extend slightly beyond the perimeter of suitcase 10, but not to a degree that it would be damaged or broken even if the suitcase were bumped or thrown around. In some embodiments, central wheel 44 may be an omnidirectional wheel, as described hereinabove. In this storage operative orientation, when placed upright on the ground, suitcase 10 rests on wheels 30 and supports 32.

In a second, rolling, operative orientation, illustrated in FIGS. 1B, 2B, 3B, 4B, 5B, and 6B, the pushing handle 42 is extracted from the suitcase, enabling a user to hold onto the handle while rolling suitcase 10 along. As will be explained in detail hereinbelow with respect to FIGS. 8A and 8B, in some embodiments, extraction of the pushing handle 42 results in extraction of central wheel 44, such that central wheel 44 extends beyond the back side face 12 of suitcase 10. In this arrangement, supports 32 are raised from the ground, and suitcase 10 rests on wheels 30 and on central wheel 44, and can be easily rolled by the user without the user bearing the weight of the suitcase.

Figure 7A:
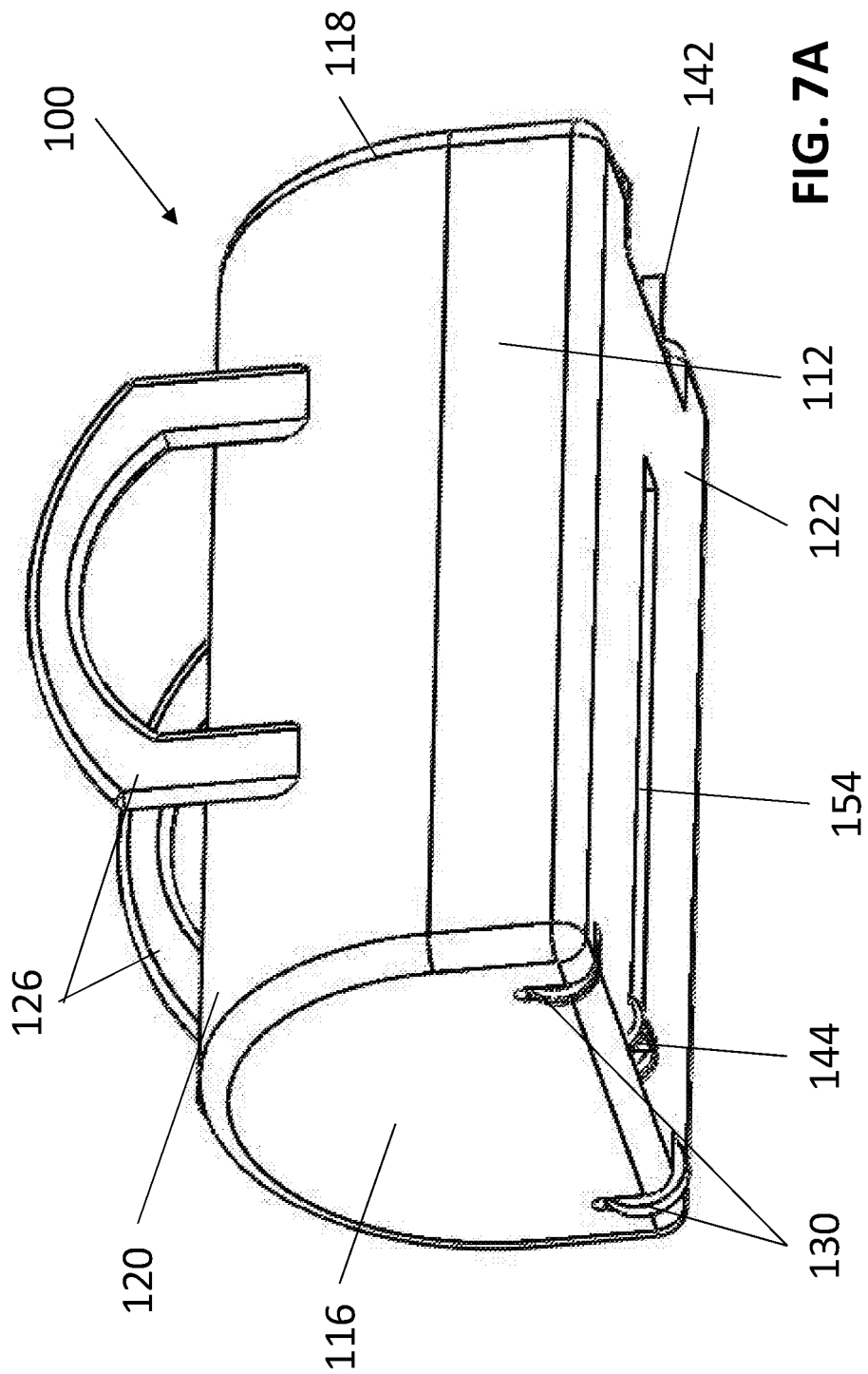

Reference is now made to FIGS. 7A and 7B, which are perspective view illustrations of a duffle bag 100 having a retractable wheel according to an embodiment of the present invention, in a storage operative orientation and in a rolling operative orientation respectively.

As seen, duffle bag 100 includes a bottom face 122, generally hemispherical right and left side faces 116 and 118, and back and front side face 112 and 114 which are integral extensions of a top face 120. The faces 112, 114, 116, 118, 120, and 122 define a suitcase volume V.

In some embodiments, duffle bag 100 includes a pair of handles 126, fixed to back and front side faces 112 and 114, and used for carrying the bag by hand.

A pair of wheels 130 are disposed at or adjacent an edge of duffle bag 100 connecting bottom face 122, and one of the right and left side faces 116 and 118 of the bag. In some embodiments, the wheels 130 are omnidirectional wheels, as described above. Wheels 130 may extend very slightly beyond the perimeter of the bag 100, but not to a degree that they would be damaged or broken even if the bag were bumped or thrown around.

Duffle bag 100 further includes a handle and wheel extraction mechanism 140 including a reversibly extractable pushing handle 142, functionally associated with a reversibly extractable central wheel 144.

In a first, storage, operative orientation, illustrated in FIGS. 7A, and 7B, the pushing handle 142 is retracted into the duffle bag, and does not extend significantly beyond the perimeter thereof. In the first operative orientation, the wheel extraction mechanism is in the storage position, such that the central wheel 144 is disposed within the duffle bag 100, as seen clearly in FIG. 7A.

In some embodiments, in the storage operative orientation, the central wheel 144 does not extend beyond a perimeter of the duffle bag, and is disposed in a recess in the bottom face 122 of bag 100. In other embodiments, central wheel 144 may extend slightly beyond the perimeter of bag 100, but not to a degree that it would be damaged or broken even if the bag were bumped or thrown around. In some embodiments, central wheel 144 may be an omnidirectional wheel, as described hereinabove. In this storage operative orientation, when the duffle bag is placed on the ground, as illustrated in FIG. 7A, bag 100 rests on bottom face 122 and on wheels 130.

In a second, rolling, operative orientation, illustrated in FIG. 7B, the pushing handle 142 is extracted from the duffle bag, enabling a user to hold onto the handle while rolling bag 100 along. As will be explained in detail hereinbelow with respect to FIGS. 8A and 8B, in some embodiments, extraction of the pushing handle 142 results in extraction of central wheel 144, such that central wheel 144 extends beyond the bottom face 122 of duffle bag 100. In this arrangement, bag 100 rests on wheels 130 and on central wheel 144, and can be easily rolled by the user without the user bearing the weight of the suitcase.

Reference is now additionally made to FIGS. 8A and 8B, which are perspective view illustrations of handle and wheel extraction mechanism 40 of suitcase 10, in the storage operative orientation and in the rolling operative orientation, respectively. It is appreciated that although the description and element numbers of FIGS. 8A and 8B correspond to the handle and wheel extraction mechanism of FIGS. 1A to 6B, the mechanism described in FIGS. 8A and 8B is suitable also for use as handle and wheel extraction mechanism 140 of duffle bag 100.

As seen, handle 42 is connected to handle extension rods 46, disposed within handle guides 48. A connector 50 extends between handle guides 48, and has connected thereto a wheel guide bar 52. A central leg 54 is pivotally connected at a top end thereof to wheel guide bar 52, and terminates, at an opposite end thereof, in central wheel 44. Central leg 54 is adapted to be disposed within wheel guide bar 52 in the storage operative orientation, as illustrated in FIG. 7A.

A central wheel driving element 56 is fixedly attached to lower ends of handle extension rods 46, is slidably disposed within handle guides 48, and is slidably disposed on wheel guide bar 52. Central wheel driving element 56 includes a protrusion, adapted to slide within a slot in wheel guide bar 52, which protrusion pivotally connects to a rod 58. Rod 58 is pivotally connected also to central leg 54.

In the storage operative orientation, illustrated in FIG. 7A, handle extension rods 46 are disposed fully within handle guides 48, such that central wheel driving element 56, which is fixedly attached to the bottom end of handle extension rods 46, is disposed at the bottom of handle guides 48. In this embodiment, rod 58 is disposed parallel to wheel guide bar 52 and to central leg 54, and thus the leg is disposed within wheel guide bar 52, and is central wheel 44 is retracted (see for example FIG. 1A, where central leg 54 and wheel 44 are disposed within the recess in the back face 12 of suitcase 10).

When the user pulls handle 42 upwards out of suitcase 10, handle extension rods 46 and central wheel driving element 56 move upward together with handle 42 within handle guides 48. As such, the central wheel driving element slides upward along wheel guide bar 52. Upward motion of central wheel driving element 56 causes rod 58 to pivot relative to central wheel driving element 56, thus causing rod 58 to push central leg 54 outward, away from wheel guide bar 52 and from back side face 12 of suitcase 10. In such embodiments, rod 58 typically pivots until it is disposed substantially transverse to wheel guide bar 52, as illustrated in FIG. 7B. As such, extraction of handle 42, results in corresponding and concurrent extraction central leg 54 and central wheel 44, to facilitate rolling the suitcase on wheels 30 and central wheel 44 while pushing or pulling handle 42.

In some embodiments, the handle and wheel extraction mechanism 40 has two stable orientations—a storage orientation when the handle is fully retracted, and the central wheel is disposed within the back face of the suitcase or adjacent thereto, and a rolling orientation when the handle and central wheel are fully retracted.

In other embodiments, rod 58 may include two rod portions connected by an axle or hinge, and pivotable relative to each other. In some such embodiments, the handle and wheel extraction mechanism has three stable orientations—storage and rolling orientations as described above, and a third, intermediate orientation, in which only one portion of rod 58 extends outward from wheel guide bar 52 and central leg 54 and central wheel 44 are extracted from suitcase 10 to a partial extent.

In some embodiments, in the storage operative orientation, handle 42 is locked within handle guides 48, for example by suitable pins extending from bottom ends of handle extension rods 46 which engage suitable apertures in handle guides 48. In some embodiments, in the rolling operative orientation, handle 42 is locked in the extracted position, for example by suitable pins extending from bottom ends of handle extension rods 46 which engage suitable apertures at the upper ends of handle guides 48. In some such embodiments, handle 42 includes a first button (not explicitly shown) engagable by the user to release the locking of handle 42 from handle guides 48 (for example to retract the pins from the apertures), to enable extraction and/or retraction of the handle.

In some embodiments, the handle 42 further includes a second button (not explicitly shown), that, when pressed by the user, disassociates the central leg 54 and central wheel 44 from handle 42, such that the handle may be extracted without concurrent extraction of central wheel 44. For example, the second button may release a connection between central wheel driving element 56 and handle extension rods 46.

The proposed suitcase is advantageous in that:
The user does not bear the weight of the suitcase while it is being pushed
Pushing and pulling of the suitcase occur when the user's hand and palm are in their natural position, thus preventing fatigue and pain of the user's muscles.
The wheels do not extend beyond the perimeter of the suitcase, or extend only slightly beyond the perimeter, and thus are not exposed to bangs and breakage.
The suitcase can be manufactured from a fabric or a sturdy plastic material, such that the closing zipper of the suitcase divides it to two sections, one having 90% of the volume and the other having 10% of the volume, as opposed to current four wheel suitcases which are divided such that the two sections each include 50% of the volume of the suitcase.

It will be appreciated that although the description above is provided with respect to a suitcase, the mechanism illustrated in FIGS. 7A and 7B may be installed in any type of luggage article, such as a duffle bag, a backpack, a hiking bag, a mochila bag, and the like.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A luggage article, comprising:
a body including a top face, a bottom face, and a plurality of side faces;
a first pair of wheels disposed at said bottom face of said body;
a handle, having a first operative orientation wherein a majority of said handle is disposed within said body and a second operative orientation wherein said handle is extracted from said body;
a central wheel, functionally associated with said handle, such that in said first operative orientation of said handle, said central wheel is retracted and disposed in or adjacent one of said plurality of side faces or said bottom face of said body, and in said second operative orientation said central wheel is extracted and extends outwardly from said body; and
a handle and wheel extraction mechanism forming said functional association between said handle and said central wheel, said handle and wheel extraction mechanism comprising:
a pair of handle extension rods extending downwardly from said handle;
a pair of handle guides, having said handle extension rods slidably disposed therein;
a wheel guide bar fixed between said handle guides; and
a central leg, pivotally connected at a top end thereof to said wheel guide bar, and terminating at a bottom end thereof in said central wheel,
wherein extraction of said handle results in said handle extension rods sliding upwardly within said handle guides, and
wherein, when said handle is in said first operative orientation, said central leg is disposed within said wheel guide bar.

2. The luggage article of claim 1 being a suitcase, wherein:
said handle is extractable from said top face;
in said first operative orientation of said handle said central wheel is disposed adjacent a back side face of said plurality of side faces of said body; and
in said second operative orientation said central wheel extends away from said back side face.

3. The luggage article of claim 1 being a duffle bag, wherein:
said handle is extractable from one of said plurality of side faces;
in said first operative orientation of said handle said central wheel is disposed adjacent said bottom face of said body; and
in said second operative orientation said central wheel extends away from said bottom face.

4. The luggage article of claim 1, wherein in said second operative orientation of said handle said luggage article is supported on said first pair of wheels and said retractable wheel.

5. The luggage article of claim 1, wherein each wheel of said first pair of wheels comprises an omnidirectional wheel.

6. The luggage article of claim 1, wherein said central wheel comprises an omnidirectional wheel.

7. The luggage article of claim 1, further comprising a pair of supports disposed on said bottom face of said body, wherein in said first operative orientation of said handle said luggage article is supported on said first pair of wheels and on said pair of supports.

8. The luggage article of claim 7, wherein each support of said pair of supports comprises a wheel, such that when said luggage article is in said first operative orientation of said handle, said luggage article is rollable on said first pair of wheels and said pair of supports.

9. The luggage article of claim 1, wherein said handle and wheel extraction mechanism further comprises:
a central wheel driving element fixedly attached to said handle extension rods and slidably disposed within said handle guides, said central wheel driving element being slidable along said wheel guide bar; and
a rod, pivotally connected to said central wheel driving element and to said central leg,
wherein, when said handle is in said first operative orientation, said rod is disposed parallel to said wheel guide bar and to said central leg, and
wherein, as said handle is extracted, said central wheel driving element moves upwardly along said wheel guide bar, causing said rod to pivot relative to said wheel guide bar and to push said central leg outward, away from said body of said luggage article.

10. The luggage article of claim 9, wherein, when said handle is in said second operative orientation, said rod is substantially perpendicular to said wheel guide bar.

11. The luggage article of claim 9, wherein:
said rod includes a first rod portion pivotally connected to said wheel guide bar and a second rod portion pivotally connected to said central leg, said first and second rod portions being pivotable relative to each other;
when said handle is in said second operative orientation, said first and second rods are aligned and are both substantially perpendicular to said wheel guide bar; and
said handle having a third operative orientation, wherein said handle is partially extracted, and one of said first and second rod portions is substantially perpendicular to said wheel guide bar and the other of said first and second rod portions is substantially parallel to said wheel guide bar.

12. The luggage article of claim 1, wherein said handle and wheel extraction mechanism further comprises:
a handle locking mechanism, adapted to lock a position of said handle relative to said handle guides; and
a handle release button adapted, when pressed by a user, to release said handle locking mechanism, to facilitate movement of said handle relative to said handle guides, thereby to move said handle between said first operative orientation and said second operative orientation.

13. The luggage article of claim 1, wherein said handle and wheel extraction mechanism further comprises:
a central wheel releasing mechanism, adapted to reversibly disassociate said central wheel from said handle; and
a central wheel releasing button adapted, when pressed by a user, to activate said central wheel releasing mechanism, to facilitate transitioning of said handle between said first and second operative orientations while said central wheel remains retracted.

14. The luggage article of claim 1, wherein said one of said plurality of side faces or said bottom face includes a recess, and wherein, when said handle is in said first operative orientation, said central wheel is disposed within said recess.

15. The luggage article of claim 14, wherein, when said central wheel is disposed within said recess, said central wheel is flush with said one of said plurality of side faces or said bottom face.

16. A method using the luggage article of claim 1, the method comprising:
moving said handle from said first operative orientation to said second operative orientation of said handle, thereby to extract said central wheel from said body; and
rolling said luggage article while said luggage article is supported by said pair of wheels and by said central wheel.

17. The method of claim 16, further comprising:
returning said handle from said second operative orientation to said first operative orientation, thereby to retract said central wheel to said body of said luggage article.

* * * * *